United States Patent [19]
Yumoto

[11] Patent Number: 5,934,881
[45] Date of Patent: Aug. 10, 1999

[54] SNAP ACTION FLOAT VALVE ASSEMBLY WITH REVERSIBLE PLATE SPRING FOR LIQUID FEEDING DEVICE

[75] Inventor: Hideaki Yumoto, Kakogawa, Japan

[73] Assignee: TLV Co., Ltd., Kakogawa-cho, Japan

[21] Appl. No.: 08/690,805

[22] Filed: Sep. 13, 1996

[30] Foreign Application Priority Data

Oct. 13, 1995 [JP] Japan .................................. 7-291951
Apr. 18, 1996 [JP] Japan .................................. 8-122315

[51] Int. Cl.$^6$ ...................................................... F04B 9/12
[52] U.S. Cl. .......................... 417/133; 417/132; 137/418
[58] Field of Search .................... 417/132, 133; 137/209, 418

[56] References Cited

U.S. PATENT DOCUMENTS

| Re. 34,957 | 5/1995 | Francart . | |
|---|---|---|---|
| 1,132,942 | 3/1915 | Jay | 261/73 |
| 1,409,550 | 3/1922 | Jennings . | |
| 1,504,151 | 8/1924 | Seck . | |
| 1,699,464 | 1/1929 | Dutcher | 137/165 |
| 2,208,789 | 7/1940 | Armstrong . | |
| 3,073,337 | 1/1963 | May . | |
| 3,324,878 | 6/1967 | Dill . | |
| 3,635,251 | 1/1972 | Gaines . | |
| 3,685,792 | 8/1972 | Henning . | |
| 4,899,979 | 2/1990 | Stamp . | |
| 5,080,126 | 1/1992 | De Rycke et al. . | |
| 5,230,361 | 7/1993 | Carr et al. . | |
| 5,358,038 | 10/1994 | Edwards et al. . | |
| 5,445,501 | 8/1995 | Yumoto . | |
| 5,655,888 | 8/1997 | Yumoto | 137/132 |

FOREIGN PATENT DOCUMENTS

| 175609 | 5/1905 | Germany . |
|---|---|---|
| 46-36295 | 10/1971 | Japan . |

OTHER PUBLICATIONS

Draining Liquids From Compressed Air and Other Gases, Armstrong, No Date, 2 pages.

*Primary Examiner*—Timothy S. Thorpe
*Assistant Examiner*—Ehud Gartenberg
*Attorney, Agent, or Firm*—Kenyon & Kenyon

[57] ABSTRACT

A liquid forced-feed apparatus, such as a steam trap or pump-trap combination, simplified in construction by decreasing the number of component parts, and capable of switching a change-over valve smoothly with reduced buoyancy. A float, a change-over valve and a snap mechanism are built in a hermetic vessel. The snap mechanism includes a float arm which rotates around a first shaft, a sub-arm which rotates around a second shaft, a spring bracket section formed on the float arm, a spring bracket section formed on the sub-arm, and a reversible plate spring disposed between the spring bracket sections. The float is connected to the float arm, and the change-over valve is connected to the sub-arm.

14 Claims, 5 Drawing Sheets

FIG. 1

PRIOR ART

SNAP ACTION FLOAT VALVE ASSEMBLY WITH REVERSIBLE PLATE SPRING FOR LIQUID FEEDING DEVICE

BACKGROUND OF THE INVENTION

1. Field of the Invention

The present invention relates to a liquid forced-feed apparatus for feeding a liquid such as water, fuel, etc. under pressure. The liquid forced-feed apparatus of the present invention is suitable particularly for use in collecting a condensate generated in a steam piping system and feeding this condensate to a boiler or a waste heat recovery system, to thereby act as a trap or pump-trap combination.

2. Description of the Prior Art

Condensate generated in a steam piping system in most cases still has a considerable quantity of stored waste heat. Therefore it has been a widespread practice to use a condensate recovery system including a liquid forced-feed apparatus, in the form of a trap, for recovering the condensate and feeding it into a boiler or a waste heat recovery system. Such a system is for the purpose of utilization of waste heat from the condensate, thus realizing the effective use of this energy.

The liquid forced-feed apparatus used in condensate recovery systems collects condensate in a hermetic vessel, and introduces a high-pressure working fluid such as steam into the hermetic vessel by operating a change-over valve, thereby discharging the condensate from the inside of the hermetic vessel under the pressure of the working fluid.

To insure high-efficiency operation of the liquid forced-feed apparatus, it is necessary to collect as much condensate as possible within the hermetic vessel and to properly switch the change-over valve. The liquid forced-feed apparatus of the prior art, therefore, generally use a snap mechanism provided with a coil spring, in order to insure reliable switching of the change-over valve. One prior art liquid forced-feed apparatus which is equipped with a built-in snap mechanism using a coil spring is disclosed in U.S. Pat. No. 5,141,405.

Figure 1:
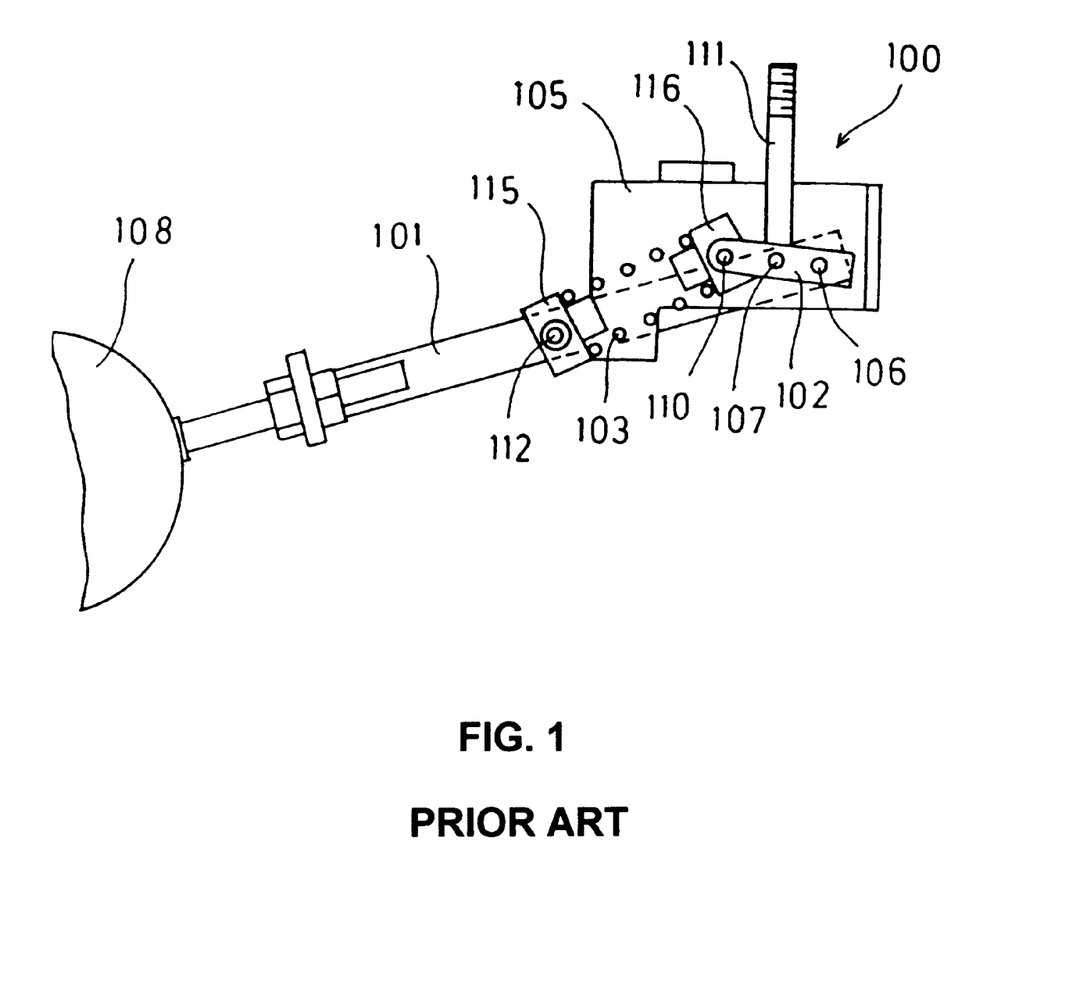
FIG. 1 is a partial view of a prior art snap mechanism.

FIG. 1 is a front view of a snap mechanism used in the prior art liquid forced-feed apparatus of U.S. Pat. No. 5,141,405. In the liquid forced-feed apparatus disclosed in the U.S. Pat. No. 5,141,405 the snap mechanism 100 includes a float arm 101, a sub-arm 102, and a coil spring 103 in a compressed condition. The main arm 101 is rotatably supported on a pin 106 in relation to a supporting member 105. On the forward end of the float arm 101 is connected a float 108.

The sub-arm 102 is connected at one end to the supporting member 105 by the same pin 106 as the float arm 101, and at the other end to one end of the coil spring 103 by a pin 110 through a spring bracket member 116. On the central part of the sub-arm 102 is connected a valve spindle operating rod 111, by a pin 107. The valve spindle operating rod 111 is connected to a change-over valve (not shown), and the snapping mechanism 100 is linked to the change-over valve through the valve spindle operating rod 111.

The other end of the coil spring 103 in FIG. 1 is connected to the float arm 101 by a pin 112, through a spring bracket member 115. In the prior art liquid forced-feed apparatus of U.S. Pat. No. 5,141,405 shown in FIG. 1, with the accumulation of condensate in the hermetic vessel (not shown), the float 108 rises. As the float 108 rises, the spring bracket member 115 side of the coil spring 103 moves upward with the rise of the float 108, thus compressing to deform the coil spring 103. Rising of the float 108 causes the coil spring 103 to move in line with the sub-arm 102, and with further rising of the float 108—until an angle between the coil spring 103 and the sub-arm 102 exceeds 180 degrees—the coil spring 103 suddenly recovers from deformation, and the connecting section (the pin 110) between the coil spring 103 and the sub-arm 102 snaps downward, resulting in downward movement of the valve spindle operating rod 111 connected to the sub-arm 102 to thereby switch the change-over valve (not shown).

SUMMARY OF THE INVENTION

The prior art liquid forced-feed apparatus has a problem. Since the sub-arm is snapped to open and close the change-over valve, valve change-over operation can be done relatively reliably; however, a pin is needed for rotatably connecting the spring bracket member. The need for this pin increases the number of component parts and makes the construction complicated. Furthermore, because of resistance resulting from the frictional forces at the pin, smooth operation is hindered; to overcome this frictional resistance, a larger buoyancy at the float is needed. This need for increased buoyancy, however, increases the size of the float, and therefore increases the overall size of the apparatus.

In view of the above-described problems inherent to the known prior art apparatus, it is an object of the present invention to provide a liquid forced-feed apparatus which is of a simple construction with fewer component parts, and which is capable of actuating the change-over valve with a smaller buoyancy of the float.

The present invention is a liquid forced-feed apparatus provided with a hermetic vessel which has a working fluid inlet port, a working fluid exhaust port, a forced-feed liquid inlet port, and a forced-feed liquid discharge port. Within the hermetic vessel is a float, a change-over valve, and a snap mechanism. The snap mechanism has a first shaft supported in the hermetic vessel, a float arm rotating around the first shaft, a second shaft supported in the hermetic vessel at a point apart from the first shaft and parallel to the first shaft, a sub-arm rotating around the second shaft, a spring bracket section formed on the float arm, a spring bracket section formed on the sub-arm, a reversible plate spring disposed between the both spring bracket sections, and a restraining member for reversing the reversible plate spring by restraining the curving of the reversible plate spring. The float is connected to the float arm and the change-over valve is connected to the sub-arm.

In one embodiment of the liquid forced-feed apparatus of the present invention, as the float moves, the sub-arm snaps to switch the change-over valve, thus forcing the liquid accumulated out of the hermetic vessel in a manner similar to the prior art apparatus. With the accumulation of condensate in the hermetic vessel, the float rises to rotate the float arm around the first shaft in connection with the rise of the float, and the restraining member causes the reversible plate spring to be curved in an "S"-shape, and thereafter reversed. With the reversal of the reversible plate spring, the sub-arm snaps and the change-over valve is switched.

In a second embodiment of the liquid forced-feed apparatus of the present invention, as the float moves, the sub-arm snaps to switch the change-over valve, thus forcing the liquid accumulated out of the hermetic vessel. The accumulation of condensate in the hermetic vessel causes the float to rise to rotate the float arm around the shaft, thereby causing the spring bracket section formed on the float arm to approach a line between the shaft and the spring bracket section formed on the sub-arm. In the process of this movement, the reversible plate spring bends further to come into contact with the restraining member. As the float rises beyond a specific position, the reversible spring plate reverses to cause the spring bracket section formed on the sub-arm to snap to the opposite side of the initial position with respect to the line connecting the shaft and the spring bracket section formed on the float arm. As a result, the valve spindle operating rod moves to switch the change-over valve.

In the snap mechanism used in the liquid forced-feed apparatus of the present invention, because the spring bracket section is formed on the float arm and the sub-arm, no supporting section is needed for rotatably connecting the spring bracket member. It is therefore possible to decrease the number of component parts, thereby enabling simplification of construction. Furthermore, since the spring bracket section has no rotating support, the apparatus can operate very smoothly and the change-over valve can be properly operated with great power—even when little buoyancy, that is, a small float, is used.

BRIEF DESCRIPTION OF THE DRAWINGS

The above-mentioned and other objects, features and advantages of the present invention will become more apparent by referring to the following description of preferred embodiments of the invention, taken in conjunction with the accompanying drawings, in which.

DETAILED DESCRIPTION OF THE INVENTION

Figure 2:
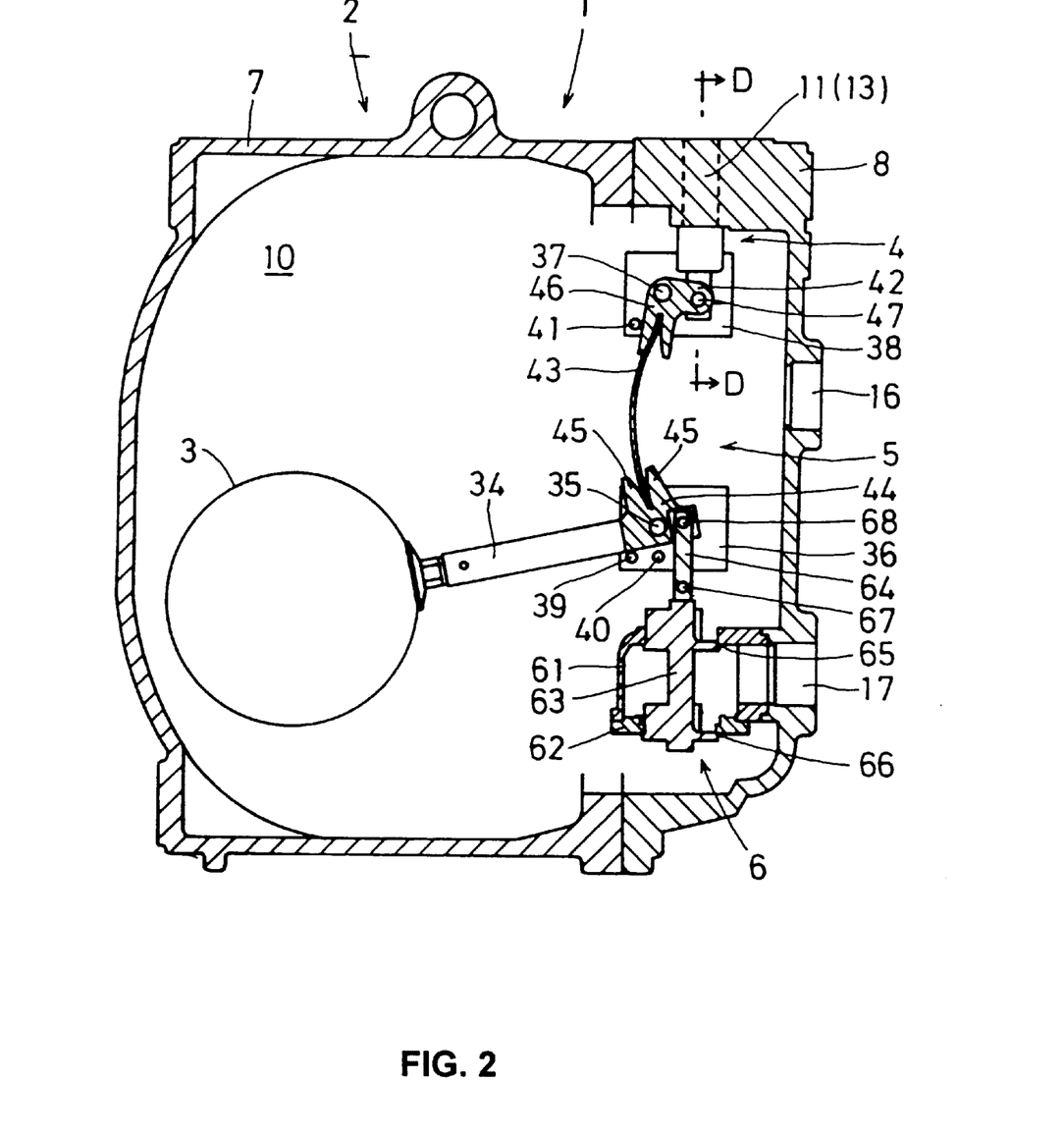
FIG. 2 is a sectional view of a first embodiment of the liquid forced-feed apparatus according to the present invention.

In FIG. 2, the liquid forced-feed apparatus 1 of a first embodiment of the present invention has a float 3, a change-over valve 4, a snap mechanism 5, and a valve 6 in a hermetic vessel 2. In the hermetic vessel 2, a body section 7 and a cover section 8 are connected by screws (not shown), and a liquid holding space 10 is formed inside. In the embodiment of FIG. 2, the body section 7 of the hermetic vessel 2 is only a vessel; distinctive components of the embodiment of FIG. 2 are all mounted on the cover section 8 of the hermetic vessel 2. The cover section 8 is provided with four openings: a working fluid inlet port 11, a working fluid outlet port 13, a forced-feed liquid inlet port 16, and a forced-feed liquid discharge port 17.

Figure 4:
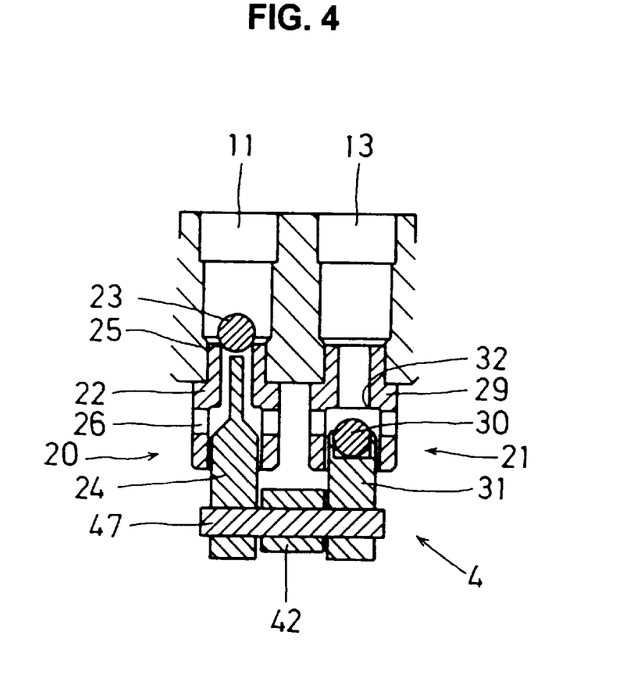
FIG. 4 is an enlarged sectional view taken on line D—D of FIG. 2.

As shown in FIG. 4, inside the working fluid inlet port 11, in a position inside the hermetic vessel 2, a working fluid feed valve 20 is mounted, and inside of the working fluid outlet port 13 is mounted a working fluid exhaust valve 21. The working fluid feed valve 20 includes a valve case 22, a valve head 23, and a valve lifting rod 24. The valve case 22 has a through hole provided in an axial direction; the upper end of the through hole functions as a valve seat 25. In the intermediate part of the valve case 22 four openings 26 connecting the through hole with the liquid holding space 10 are provided. The valve head 23 is of a semi-spherical form and is installed at the tip of the valve lifting rod 24. The forward end of the valve case 22 of the working fluid feed valve 20 is screwed in the working fluid inlet port 11. The valve head 23 is located on the working fluid inlet port 11 side, and the valve lifting rod 24 is inserted through the through hole in the valve case 22 on the hermetic vessel 2 side, into connection with a sub-arm 42 of the snap mechanism 5, through a shaft 47.

The working fluid exhaust valve 21 includes a valve case 29, a valve head 30, and a valve lifting rod 31. The valve case 29 has a through hole in an axial direction, in which a valve seat 32 is provided. The valve head 30 which is installed on the tip of the valve lifting rod 31 comes from below into contact with the valve seat 32, thus opening and closing the valve. The valve lifting rod 31 is connected to the sub-arm 42 of the snap mechanism through the shaft 47. The change-over valve 4 therefore includes both the working fluid feed valve 20 and the working fluid exhaust valve 21. When the working fluid feed valve 20 is opened, the working fluid exhaust valve 21 is closed, and when the working fluid feed valve 20 is closed, the working fluid exhaust valve 21 is opened.

The forced-feed liquid inlet port 16 is located near the center of the cover section 8 and the forced-feed liquid discharge port 17 is in a position corresponding to the lower part of the hermetic vessel 2.

The float 3 is supported by a bracket 36 through a float arm 34 and a first shaft 35. The snap mechanism 5 is supported on the bracket 36 through the first shaft 35. The brackets 36, 38 are both integrally attached to the cover section 8 of the hermetic vessel 2 by screws (not shown). The bracket 36 is made of two parallel plates facing each other, and supports the shafts 39 and 40 and the first shaft 35, via bearing 300. The shafts 39 and 40 also serve stoppers for the upper and lower limits of the float 3. Bracket 38 is also produced of two parallel plates facing each other and supports a shaft 41 and the second shaft 37. The shaft 41 serves as a stopper for the sub-arm 42.

Figure 5:
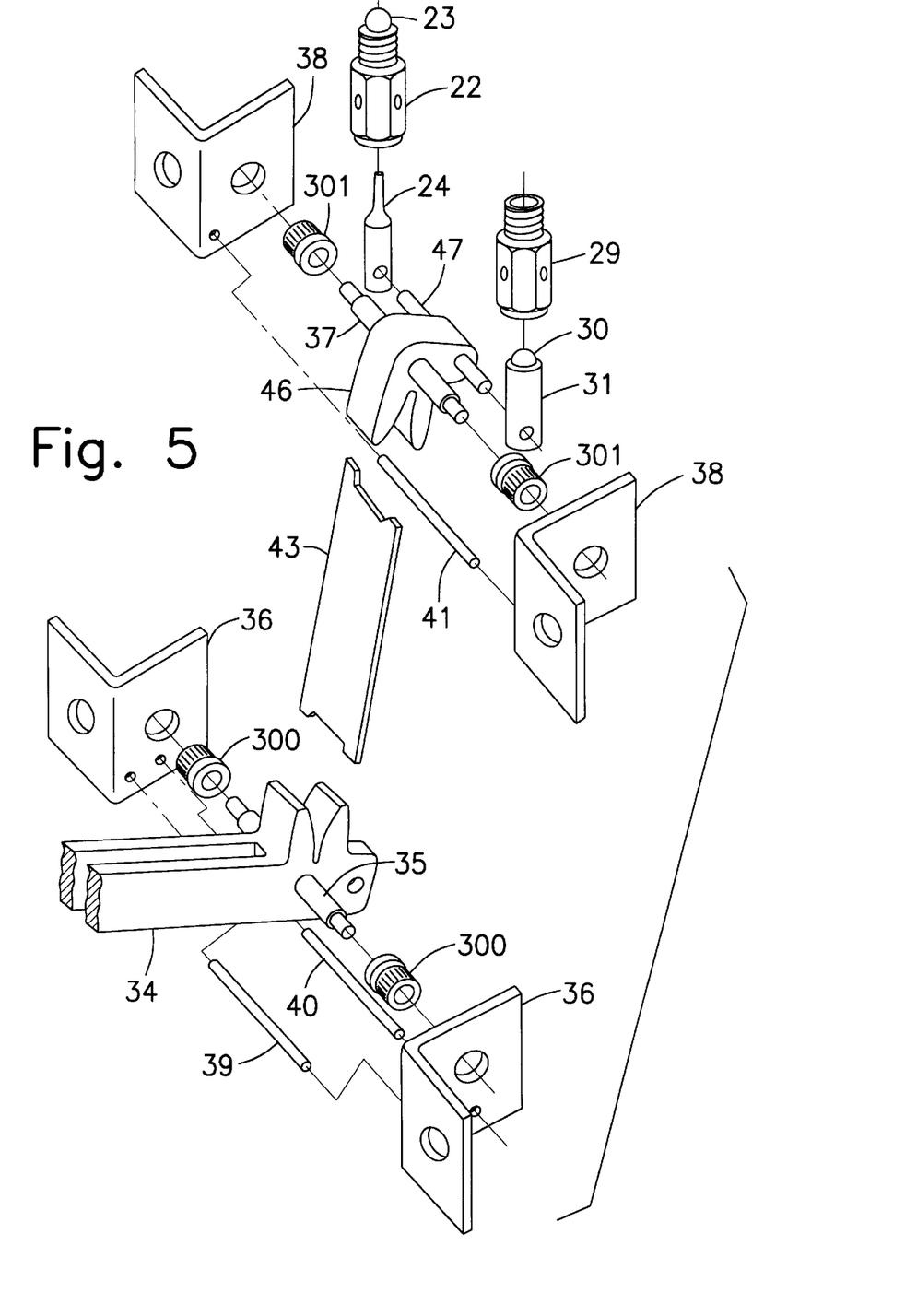
FIG. 5 is an exploded view of the snap mechanism of the first embodiment of the present invention.

The snap mechanism 5 includes a float arm 34, a sub-arm 42, and a reversible plate spring 43. The float arm 34 has one end connected to the float 3 and another side rotatably connected to the first shaft 35 and rocks up and down around the first shaft 35. The float arm 34 has formed at one side and facing upwardly a "V"-shaped projecting spring bracket section 44, the left and right sides of the "V"-shaped portion serving as restraining members 45.

The sub-arm 42 is rotatably supported on the second shaft 37, which is mounted in bearings 301. The sub-arm 42 is formed at one side with a downwardly facing "V"-shaped projecting spring bracket section 46. Between the spring bracket section 44 and the spring bracket section 46 is disposed a curved reversible plate spring 43. Also, at one end of the sub-arm 42 is inserted shaft 47, to which the lower ends of the lifting rods 24 and 31 are connected.

On the liquid holding space 10 side of the forced-feed liquid discharge port 17 is provided the valve 6, which is a composite seat valve. The valve 6 includes upper and lower cases 61, 62, upper and lower valve bodies 63 and a drain valve shaft 64. The upper valve case 61 and the lower valve case 62 are secured by screws (not shown), and the upper valve case 61 is secured to the cover section 8 by screws (not shown). The upper case is formed with an upper valve seat 65, and the lower valve case 62 is formed with a lower valve seat 66. The upper and lower valve bodies 63 are pivotally connected to drain valve shaft 64 by a shaft 67, and the upper end of the drain valve shaft 64 is pivotally connected to an end of the float arm 34 by a shaft 68. The upper and lower valve bodies 63 move down as the float 3 moves up, and thus are moved from the upper and lower valve seats 65 and 66 to communicate the liquid holding space 10 with the forced-feed liquid discharge port 17. The upper and lower valve bodies 63 move up as the float 3 moves down, and thus are seated on the upper and lower valve seats 65 and 66 to cut off the liquid holding space 10 from the forced-feed liquid discharge port 17.

Next, operation of the first embodiment of the liquid forced-feed apparatus 1 will be explained according to a series of operation procedures in which steam is used as a working fluid. First, the external piping of the liquid forced-feed apparatus 1 is connected on the working fluid inlet port 11 side to the high-pressure steam source, and on the working fluid discharge port 13 side to the steam circulating piping. The forced-feed liquid inlet port 16 is connected to a load, such as a steam-using apparatus, via a check valve (not shown) which opens towards the liquid holding space 10. The forced-feed liquid discharge port 17 is connected to liquid forced-feed parts such as a boiler, etc., via a check valve (not shown) which opens outward from the liquid holding space 10.

When no condensate is present in the liquid holding space 10 of the liquid forced-feed apparatus 1 of the first embodiment, the float 3 is in the bottom position shown in FIG. 2. At this time, the working fluid feed valve 20 in the change-over valve 4 is closed, while the exhaust valve 21 is open. The valve 6 is closed in this condition. When condensate is produced in the load, such as a steam-using apparatus, the condensate flows down through the forced-feed liquid inlet port 16 into the liquid forced-feed apparatus 1, accumulating in the liquid holding space 10.

As the float 3 rises with the accumulation of condensate in the liquid holding space 10, the float arm 34 rotates clockwise on the center of the shaft 35, and the shaft 68 which is connected to the drain valve shaft 64 moves down. The upper and lower valve bodies 63 move down via movement of the drain valve shaft 64, and the valve 6 is open.

Figure 3A:
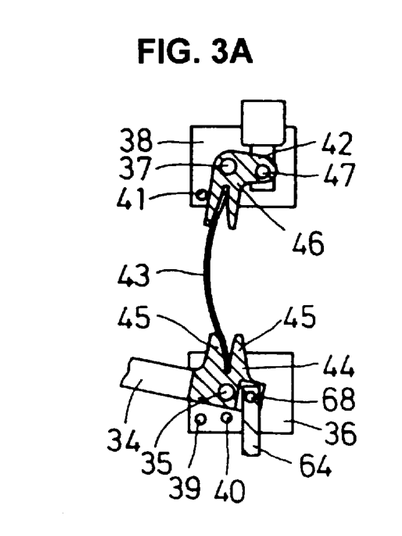
FIGS. 3A–3C are explanatory views of the reversible operation of a reversible plate spring of FIG. 2.
Figure 3B:
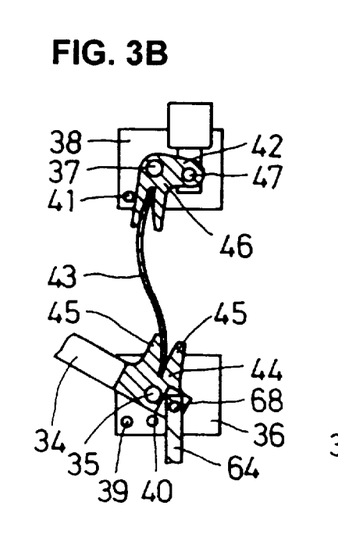
Figure 3C:
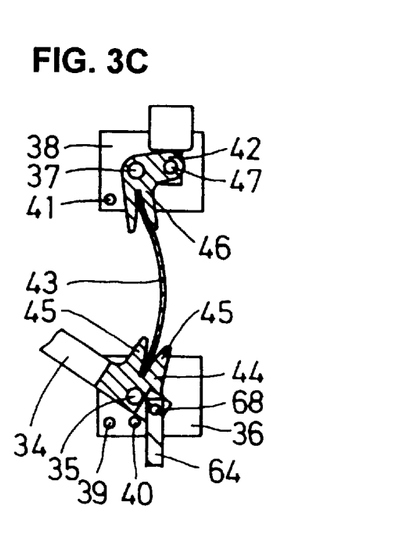

The snap mechanism 5, with the clockwise rotation of the float arm 34, causes the left side of the restraining member 45 to come into contact with the reversible flat spring 43 (see FIG. 3A) to cause the reversible plate spring 43 to be curved in an "S"-shape (see FIG. 3B), eventually resulting in the reversible plate spring 43 being reversed (FIG. 3C). With this reversing of the reversible plate spring 43, the sub-arm 42 rotates in the counterclockwise direction so that the shaft 47 snaps upward. As a result, the lifting rods 24 and 31 connected to the shaft 47 move up so that the working fluid feed valve 20 is opened and the working fluid exhaust valve 21 is closed.

When the working fluid inlet port 11 is open, high pressure steam is introduced into the hermetic vessel 2 to elevate the pressure inside, and the condensate accumulated in the liquid holding space 10 is pressurized by the steam pressure and discharged to the external boiler and the waste heat utilizing device through a check valve (not shown) from the forced-feed liquid discharge port 17.

With the discharge of the condensate, the water level in the condensate holding space 10 goes down to lower the float 3. The float arm 34 rotates in the counterclockwise direction on the center of the first shaft 35, and the shaft 68, which is connected with the drain valve shaft 64, moves up. The valve means 6 thus is closed.

The snap mechanism 5, with the counterclockwise rotation of the float arm 34, causes the right side of the restraining member 45 to come into contact with the reversible plate spring 43 to cause the reversible plate spring 43 to be curved in a "inverted S"-shape and the reversible plate spring 43 to be reversed. With this reversal of the reversible plate spring 43, the sub-arm 42 rotates in the clockwise direction so that the shaft 47 snaps down. As a result, the lifting rods 24 and 31 connected to the shaft 47 move down so that the working fluid feed valve 20 is closed and the working fluid exhaust valve 21 is open.

Figure 6:
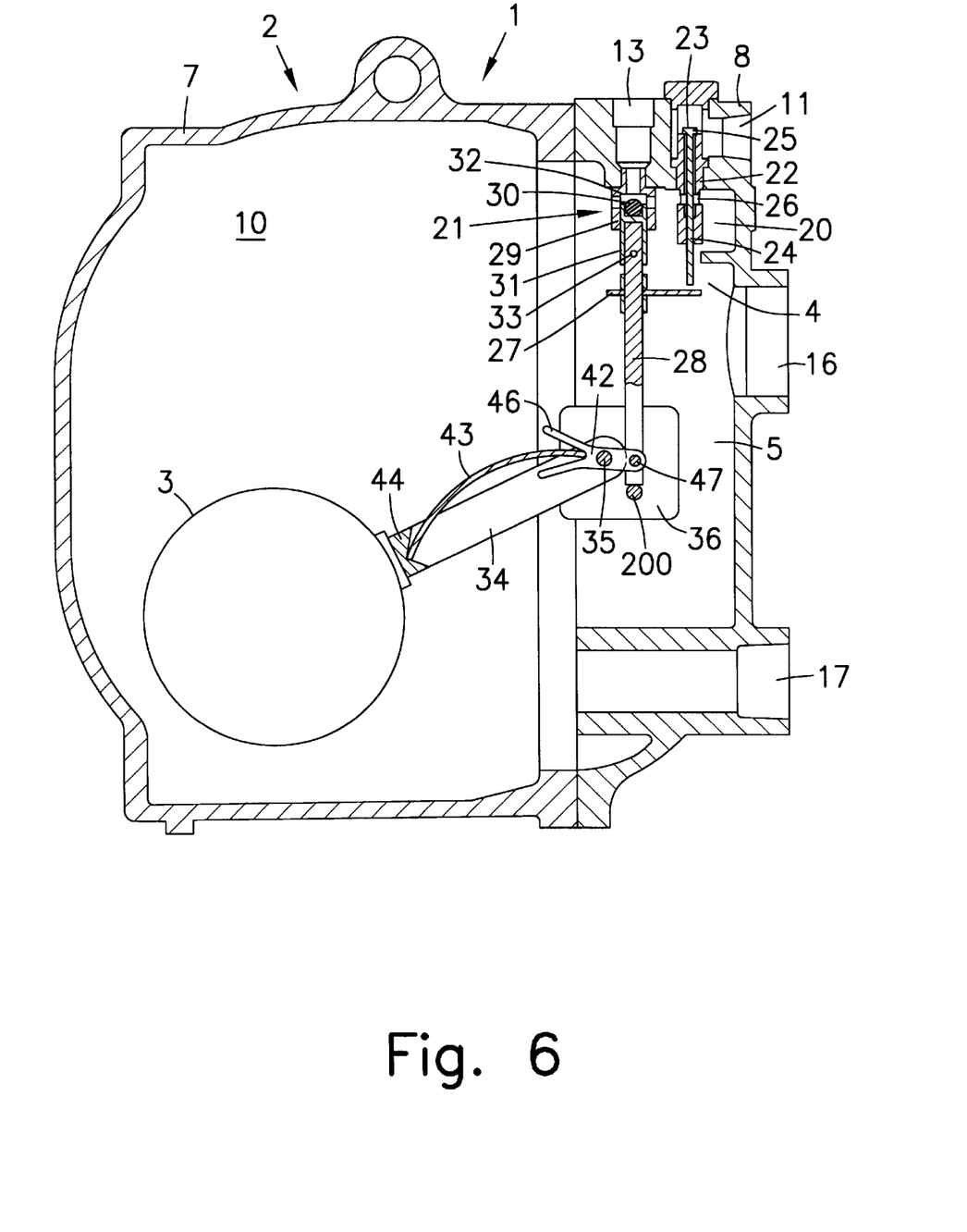
FIG. 6 is a sectional view of a second embodiment of the liquid forced-feed apparatus according to the present invention.

FIG. 6 is a sectional view of a second embodiment of the liquid forced-feed apparatus according to the present invention. In the embodiment of FIG. 6, features common to features in the embodiment of FIG. 1 are labeled with the same reference numeral. In FIG. 6, the liquid forced-feed apparatus 1 has a float 3, a change-over valve 4, and a snap mechanism 5, all within a hermetic vessel 2. To explain these members successively, the hermetic vessel 2, the body section 7, and the cover section 8 are connected by screws (not shown), and a liquid holding space 10 is formed inside. In the embodiment of FIG. 6, the body section 7 of the hermetic vessel 2 is only a vessel; distinctive components of the embodiment are mounted on the cover section 8 of the hermetic vessel 2. The cover section 8 is provided with four openings: a working fluid inlet port 11, a working fluid outlet port 13, a forced-feed liquid inlet port 16, and a forced-feed liquid discharge port 17. Inside the working fluid inlet port 11, in a position inside the hermetic vessel 2, a working fluid feed valve 20 is mounted, and inside of the working fluid outlet port 13 is mounted a working fluid exhaust valve 21. The working fluid feed valve 20 includes a valve case 22, a valve head 23, and a valve lifting rod 24. The valve case 22 has a through hole provided in an axial direction; the upper end of the through hole functions as a valve seat 25. In the intermediate part of the valve case 22 four openings 26 connect the through hole with the liquid holding space 10. The valve head 23 is of a semi-spherical form and is installed at the tip of the valve lifting rod 24.

In the liquid forced-feed apparatus 1 of the embodiment of FIG. 6, the forward end of the valve case 22 of the working fluid feed valve 20 is screwed in the working fluid inlet port 11. The valve head 23 is located on the working fluid inlet port 11 side, and the valve lifting rod 24 is inserted through the through hole in the valve case 22 on the hermetic vessel 2 side into contact with a connecting plate 27. The connecting plate 27 is connected with the valve spindle operating rod 28. The valve spindle operating rod 28 is connected to the snap mechanism 5.

The working fluid exhaust valve 21 is composed of a valve case 29, a valve head 30, and a valve lifting rod 31. The valve case 29 has a through hole in an axial direction, in which a valve seat 32 is provided. The valve head 30 secured on the tip of the valve lifting rod 31 comes from below into contact with the valve seat 32, thus opening and closing the valve. The valve spindle operating rod 28 and the valve lifting rod 31 are connected by a pin 33. The change-over valve 4 includes both the working fluid supply valve 20 and the working fluid exhaust valve 21. When the working fluid feed valve 20 is opened, the working fluid exhaust valve 21 is closed, and when the working fluid feed valve 20 is closed, the working fluid exhaust valve 21 is opened.

The forced-feed liquid inlet port 16 is located near the center of the cover section 8 and the forced-feed liquid discharge port 17 is in a position corresponding to the lower part of the hermetic vessel 2.

The float 3 is supported by a bracket 36 through a float arm 34 and a rocking shaft 35. The snap mechanism 5 is supported on the bracket 36 through the shaft 200. The bracket 36 is integrally attached to the cover section 8 of the hermetic vessel 2. The bracket 36 is made of two parallel plates facing each other and supports the shaft 200 and the rocking shaft 35. The shaft 200 serves also as a stopper of the valve spindle operating rod 28.

The snap mechanism 5 includes a float arm 34, a sub-arm 42, and a reversible plate spring 43. The float arm 34, when viewed from above, is approximately U-shaped, having two parallel plates. A spring bracket section 44 is formed at the left end where these plates are connected. The spring bracket section 44, as shown in FIG. 6, is approximately V-shaped, and the float 3 is connected at that end of the float arm 34. The float 3 rocks up and down on the center of the rocking shaft 35.

On the rocking shaft 35 the central part of the sub-arm 42 is rotatably supported. The sub-arm 42 is composed of two parallel plates, and has an approximately V-shaped section at one end of each parallel plate. This side of this sub-arm 42 forms a spring bracket section 46; the upper and lower pieces of the V-shaped section constitute restraining members. Between the spring bracket section 46 and the spring bracket section 44 is disposed a curved reversible plate spring 43. Also, at another end of the sub-arm 42 is inserted a shaft 47, with which the lower end of the valve spindle operating rod 28 is connected.

Next, operation of the embodiment of the liquid forced-feed apparatus 1 of FIG. 6 will be explained according to a series of operation procedures in which steam is used as a working fluid. First, the external piping of the liquid forced-feed apparatus 1 is connected on the working fluid inlet port 11 side to the high-pressure steam source, and on the working fluid discharge port 13 side to the steam circulation piping. The forced-feed liquid inlet port 16 is connected to a load, such as a steam-using apparatus, via a check valve (not shown) which opens towards the liquid holding space 10. The forced-feed liquid discharge port 17 is connected to a boiler, etc., via a check valve (not shown) which opens outwards from the liquid holding space 10.

When no condensate is present in the liquid holding space 10 of the liquid forced-feed apparatus 1 of the embodiment of FIG. 6, the float 3 is in the bottom position as shown in FIG. 6. At this time, the working fluid feed valve 20 in the change-over valve 4 is closed, while the working fluid exhaust valve 21 is open. When the condensate is produced in the load, such as the steam-using apparatus, the condensate flows down through the forced-feed liquid inlet port 16 to the liquid forced-feed apparatus 1, accumulating in the liquid holding space 10.

As the float 3 rises with the accumulation of the condensate in the liquid holding space 10, the float arm 34 rotates clockwise on the center of the shaft 35 until the axis of the float arm 34 is in line with the axis of the sub-arm 42. In the process of this movement, the reversible plate spring 43 further bends into contact with the upper restraining member of spring brackets 44 and 46, being further deformed. As the float 3 rises further until the axis of the float arm 34 exceeds the axis of the sub-arm 42, the reversible plate spring 43 reverses, allowing the counterclockwise rotation of the sub-arm 42 to thereby snap the shaft 47 upward. Consequently, valve spindle operating rod 28 connected to the shaft 47 moves upwards, to thereby open the working fluid feed valve 20 and to close the working fluid exhaust valve 21.

With the opening of the working fluid inlet port 11, the high-pressure steam is led into the hermetic vessel 2, in which a vessel pressure increases to pressurize the condensate in the liquid hold space 10, thereby forcing the condensate out at the forced-feed liquid discharge port 17 to an exterior boiler or waste heat recovery system via a check valve (not shown).

With the discharge of the condensate, the water level in the condensate holding space 10 goes down to lower the float 3. The float arm 34 rotates in the counterclockwise direction on the center of the rocking shaft 35 until the axis of the float arm 34 is aligned with the axis of the sub-arm 42. In the process of this movement, the reversible plate spring 43 further bends into contact with the lower restraining member of spring brackets 44 and 46. With further downward movement of the float 3, the axis of the float arm 34 exceeds the axis of the sub-arm 42, then the reversible plate spring 43 reverses to turn the sub-arm 42 clockwise, thereby snapping the shaft 47 downward. Consequently, the valve spindle operating rod 28 connected to the shaft 47 moves downward, closing the working fluid feed valve 20 and opening the working fluid exhaust valve 21.

The liquid forced-feed apparatus of the present invention described above has few supports and therefore the loss of force by friction is reduced. Furthermore, because of simple construction, smooth movement, and powerful operation of the change-over valve, it is possible to force-feed the liquid reliably, using a relatively small float.

From the above description of the invention, those skilled in the art will perceive improvements, changes and modifications. Such improvements, changes and modifications within the skill of one of ordinary skill in the art are intended to be covered by the appended claims.

What is claimed is:

1. A liquid forced-feed apparatus comprising:
   a vessel comprising:
      a working fluid inlet port, a working fluid exhaust port, a liquid inlet port, and a liquid discharge port;
   a float;
   a change-over valve, the change-over valve comprising:
      a working fluid feed valve at the working fluid inlet port and a working fluid exhaust valve at the working fluid exhaust port, the working fluid feed valve opening the working fluid inlet port when the working fluid exhaust valve closes the working fluid exhaust port, and the working fluid feed valve closing the working fluid inlet port when the working fluid exhaust valve opens the working fluid exhaust port; and
   a snap mechanism, the snap mechanism comprising:
      a float arm pivotally mounted in the vessel, a sub-arm pivotally mounted in the vessel, a first spring bracket section formed on the float arm, a second spring bracket section formed on the sub-arm, and a reversible plate spring disposed between the first and second spring bracket sections, wherein the float is connected to the float arm and the change-over valve is connected to the sub-arm, wherein the first spring bracket section comprises a V-shaped portion serving as restraining members for the plate spring.

2. The liquid forced-feed apparatus of claim 1, further comprising:
   a restraining member for reversing the reversible plate spring by restraining the curving of the reversible plate spring.

3. The liquid forced-feed apparatus of claim 1, further comprising:

a valve at the liquid discharge port, the valve at the liquid discharge port being connected to the float arm.

4. The liquid forced-feed apparatus of claim 1, wherein:
the float arm and the sub-arm pivot about a common shaft.

5. The liquid forced-feed apparatus of claim 1, wherein:
the float arm pivots about a first shaft and the sub-arm pivots about a second shaft parallel to the first shaft.

6. A liquid forced-feed apparatus comprising:
a vessel comprising:
working fluid inlet port, a working fluid exhaust port, a liquid inlet port, and a liquid discharge port;
a float;
a change-over valve, the change-over valve comprising:
a working fluid feed valve at the working fluid inlet port and a working fluid exhaust valve at the working fluid exhaust port, the working fluid feed valve opening the working fluid inlet port when the working fluid exhaust valve closes the working fluid exhaust port, and the working fluid feed valve closing the working fluid inlet port when the working fluid exhaust valve opens the working fluid exhaust port; and
a snap mechanism, the snap mechanism comprising:
a float arm pivotally mounted in the vessel, a sub-arm pivotally mounted in the vessel, a first spring bracket section formed on the float arm, a second spring bracket section formed on the sub-arm, and a reversible plate spring disposed between the first and second spring bracket sections, wherein the float is connected to the float arm and the change-over valve is connected to the sub-arm, wherein the second spring bracket section comprises a V-shaped portion serving as restraining members for the plate spring.

7. The liquid forced-feed apparatus of claim 6 wherein:
the first spring bracket section comprises a V-shaped portion serving as restraining members for the plate spring.

8. A liquid forced-feed apparatus comprising:
a vessel comprising;
a working fluid inlet port, a working fluid exhaust port, a liquid inlet port, and a liquid discharge port;
a float;
a change-over valve comprising:
a working fluid feed valve at the working fluid inlet port and a working fluid exhaust valve at the working fluid exhaust port, the working fluid feed valve opening the working fluid inlet port when the working fluid exhaust valve closes the working fluid exhaust port, and the working fluid feed valve closing the working fluid inlet port when the working fluid exhaust valve opens the working fluid exhaust port; and
a snap mechanism comprising:
a rocking shaft supported in the hermetic vessel, a float arm and a sub-arm rotating around the rocking shaft, a first spring bracket section formed on the float arm at a point apart from the rocking shaft, a second spring bracket section formed on the sub-arm at a point apart from the rocking shaft, and a reversible plate spring disposed between both spring bracket sections, the float being connected to the float arm, the change-over valve being connected to the sub-arm by a valve spindle operating rod, wherein the second spring bracket section comprises a V-shaped portion serving as restraining members for the plate spring.

9. A liquid forced-feed apparatus of claim 8, further comprising:
a restraining member for reversing the reversible plate spring by restraining the curving of the reversible plate spring.

10. The liquid forced-feed apparatus of claim 8, wherein:
the first spring bracket section comprises a V-shaped portion serving as restraining members for the plate spring.

11. A liquid forced-feed apparatus comprising:
a vessel comprising:
a working fluid inlet port, a working fluid exhaust port, a forced-feed liquid inlet port, and a forced-feed liquid discharge port;
a float;
a change-over valve comprising:
a working fluid feed valve at the working fluid inlet port and a working fluid exhaust valve at the working fluid exhaust port, the working fluid feed valve opening the working fluid inlet port when the working fluid exhaust valve closes the working fluid exhaust port, and the working fluid feed valve closing the working fluid inlet port when the working fluid exhaust valve opens the working fluid exhaust port; and
a snap mechanism comprising:
a first shaft supported in the vessel, a float arm rotating around the first shaft, a second shaft supported in the vessel at a point apart from the first shaft and parallel to the first shaft, a sub-arm rotating around the second shaft, a first spring bracket section formed on the float arm, a second spring bracket section formed on the sub-arm, and a reversible plate spring disposed between both spring bracket sections, the float being connected to the float arm and the change-over valve being connected to the sub-arm, wherein the first spring bracket section comprises a V-shaped portion serving as restraining members for the plate spring.

12. The liquid forced-feed apparatus of claim 11, further comprising:
a restraining member for reversing the reversible plate spring by restraining the curving of the reversible plate spring.

13. The liquid forced-feed apparatus of claim 11, further comprising:
a valve at the liquid discharge port, the valve at the liquid discharge port being connected to the float arm.

14. The liquid forced-feed apparatus of claim 11, wherein:
the second spring bracket section comprises a V-shaped portion serving as restraining members for the plate spring.

* * * * *